Sept. 24, 1946.　　　　V. MAZZARISI　　　　2,408,263
TOASTER
Filed June 24, 1946　　　2 Sheets-Sheet 1

INVENTOR.
Vito Mazzarisi
BY
Attorneys.

Sept. 24, 1946.  V. MAZZARISI  2,408,263
TOASTER
Filed June 24, 1946  2 Sheets-Sheet 2
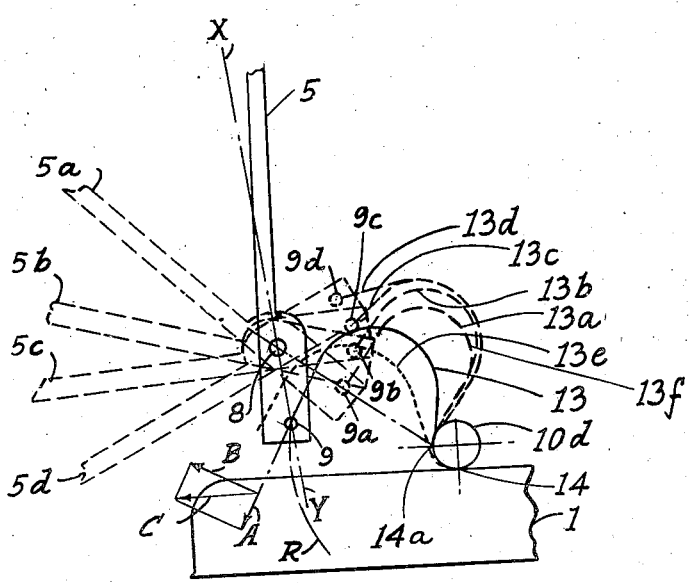
Fig. 4
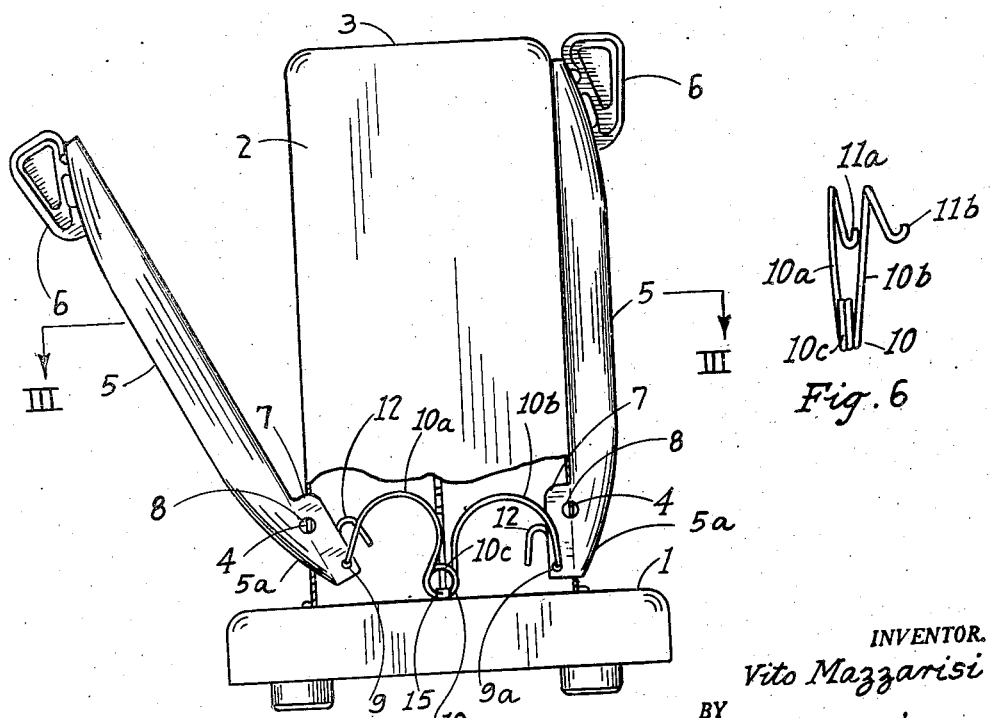
Fig. 2
Fig. 6
INVENTOR.
Vito Mazzarisi
BY
Attorneys Patented Sept. 24, 1946

2,408,263

UNITED STATES PATENT OFFICE 2,408,263

TOASTER

Vito Mazzarisi, Clifton, N. J.

Application June 24, 1946, Serial No. 678,777

9 Claims. (Cl. 99—395)

This invention relates to new and useful improvements in toasters.

In conventional toasters of the slice-reversing door type a slice of bread, inside the closed toaster door, is exposed to a heating element. When sufficiently toasted the door is opened whereupon the bread slice, sliding down the incline of the open door, is reversed so that the untoasted side is on top, ready for toasting when again closing the door.

It is necessary in toasters of this type that the door, when in the "closed" position, is at a relatively large angle of incline with respect to the vertical. Without such angle of incline the door would not remain sufficiently closed. Alternatively, it is not practical to apply conventional spring means, inter alia, because of the arc through which any point of the pivoted door, whether below or above the pivot, has to travel.

The incline of the door of conventional toasters of the slice-reversing door type needs to be such that the weight of the door at the incline will keep the same closed. This has necessitated a triangularly shaped toaster unsightly and ungainly in appearance. Furthermore, the heating elements are normally vertically arranged in a toaster of this type so that with the slanting angle of the toaster doors the toast slices are exposed to the heating element at unequal distances, i. e., they are closer to the heating element at the top than they are at the bottom of the slice. In this manner, the bread slice is thus unevenly toasted and in many cases satisfactory toasting of the base of the toast will result in a scorching of the top portion thereof.

One object of the invention comprises inter alia a toaster having at least one spring actuated slice-reversing door.

Another object of the invention comprises a toaster having at least one spring actuated substantially vertical slice-reversing door.

The foregoing and still further objects of the invention will appear from the following description read in conjunction with the drawings illustrating a preferred embodiment of the invention in which:

Fig. 2 is a side view with parts broken away of a toaster construction in accordance with the invention and having one of the slice-reversing doors partly opened;

Fig. 4 is an enlarged side view of part of a toaster construction in accordance with the invention showing various positions of a spring element in relation to various positions of the door; and Figs. 5, 6 and 7 respectively represent enlarged side, front and top views of a double spring element in accordance with a preferred embodiment of the invention.

Figure 5:
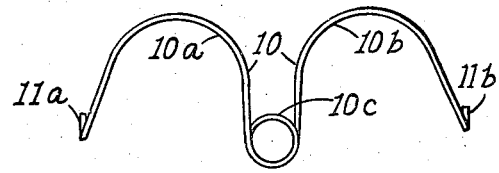
Figure 1:
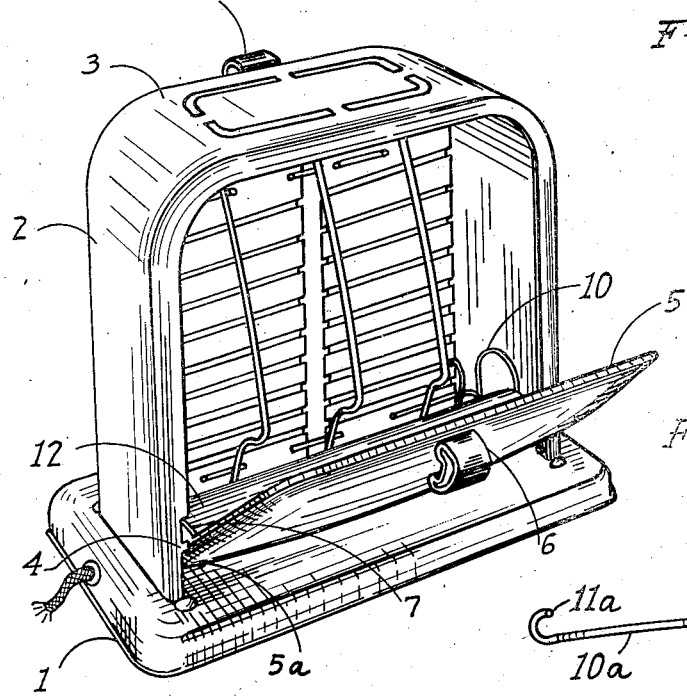
Fig. 1 represents a perspective view of a slice-reversing door type toaster constructed in accordance with the invention.

As illustrated in the drawings, 1 represents the base of a toaster with the toaster housing comprising sides 2 and top 3 secured thereto. Doors 5 are pivotally mounted on pivots 4 carried by sides 2. The pivots are preferably stamped or cut as an integral part of the housing. Doors 5 carry handle portions 6 and are pivoted intermediate their ends so that end 5(a), below the pivot, is relatively short. Doors 5 carry at their lower ends lugs 7 preferably as an integral part thereof. Lugs 7 carry pivot bearing-apertures 8 and spring bearing-apertures 9. Double spring 10 comprises coiled spring element 10c, secured to base 1 by stud 15, and individual arcuate spring elements 10a and 10b, having at their ends bent or hooked portions 11a and 11b, respectively carried in apertures 9 and 9a of doors 5. Each door carries across its base a trip bar 12 upon which a slice of bread rests when the door is closed and which serves to trip the same so as to slide down the downwardly inclined door with the untoasted face up when the door is opened. Instead of a double spring serving two doors, an individual separate spring (Fig. 4) for each door may be used.

Specifically referring to Fig. 4, 5 represents the toaster door (parts broken away), 8 the pivot bearing-aperture, 9 the spring bearing-aperture, 1 the toaster base (parts broken away), 10d the coiled spring element and 13 the arcuate spring. Broken outlines 5a, 5b, 5c and 5d respectively indicate various positions of the opening door, with 5d the fully opened slightly downwardly inclined door position at which the bread slice has been reversed. Broken outlines 13a, 13b, 13c and 13d respectively represent the positions and shapes of the arcuate spring at these various door positions; 9a, 9b, 9c and 9d indicate the respective relative positions of the spring bearing-aperture. The dotted spring outline 13e indicates the position and shape of the spring element with the end facing the door in unattached position. The solid outlines show door 5 in closed position and the arcuate spring 13 turnably fastened with one end to the door at 9. The other end of spring 13 is suitably mounted, such as on base 1 at 14 by way of the coiled spring element 10d. In the preferred construction the spring securing point 14 is substantially on a line through the axis of pivot of the door, and extending at an angle with the horizontal through said axis of not exceeding 60° and preferably between 20° and 60°.

Attaching the spring (13e) to door 5, when the latter is in closed position, involves charging the spring, i. e., deflecting it into the position shown by the solid outline 13. In this position the door attached spring arm extends at its securing point at an angle of less than 90° and preferably less than substantially 60° to the vertical X—Y on the axis of pivot of the door through the door securing point 9. A minimum spring arm angle to the vertical X—Y of at least 10° is of advantage. The spring exerts at 9 a first force A (Fig. 4) in the direction of the spring arm and a second force B substantially at right angles to the first, thus effecting a resultant force C acting to keep door 5 in closed position. As the door is opened and assumes for instance position 5a, the point of spring attachment moves to 9a and the spring itself assumes the position and shape 13a. Point 9a is substantially in direct line between door pivot point 8 and point 14a on coil 10d. In this position of the door, the spring is at about maximum lateral depression between spring ends, and assumes a position approximately tangential to the arc of travel of the spring securing points around the axis of pivot of the door between closing and maximum opening position of the latter. At the same time the spring arm 13f of spring 13a is deflected from the original position 13 against the spring force of coiled spring element 10d. Thus, moving of the door from position 5 to position 5a results in a compound spring action in which a lateral charging by depression of the spring between ends is obtained and in which further a charging in the direction of the door attached spring arm is achieved by the lifting of the latter from point 9 to point 9a and the resultant deflection, against spring resistance, of the other spring arm.

Further opening the door to for instance position 5b, the spring securing point is at 9b and the spring itself assumes the position and shape 13b. In this position the spring element 13b is still laterally charged with respect to its original position 13 but to a somewhat lesser extent than at its position 13a. The lifting of the spring securing point from 9a to 9b, however, has resulted in a further charging in the direction of the door attached spring arm by additional deflection against spring resistance of the arm at the other end of the spring. The door secured spring arm is still relatively close to tangential with respect to the arc of travel of the spring securing points of the door when opening or closing the same. Thus, in the position 5b of the door the direction of one component of the spring force is still approximately vertical to the spring arm at its point of attachment to the door but the predominating spring force at that point is downwardly and substantially in the direction of the arc of travel of the spring securing points.

When further opening the door 5 to, for instance, the position 5c, the door securing point of the spring is located at 9c and the shape and form of the spring element are shown by the broken outline 13c. In this position the distance between spring ends is substantially the same as the distance between ends of the spring in the position 13. Point 9a thus represents the half-way mark of the securing point of the spring to the door between the closed position of the door and the partly open position 5c. In the door position 5c therefore the lateral spring force between ends of the spring is about the same as it is in the original, closed position 5 of the door; this force, however, in this case is exerted substantially in an upward, door opening direction. The deflection of the base secured arm of the spring in position 13c is such and the deflection opposing spring force in this position is so selected that the increased spring resistance against which the arm has moved causes the major component of the spring force to be exerted at 9c in the direction of the door secured spring arm portion, thus resulting in a predominant downwardly directed spring force, i. e., substantially in the direction of the arc of travel of the spring securing points of the door towards its closing position.

The laterally exerted spring force at 9 and 9c is relatively small. This spring force at 9 is preferably in such relative balance with the spring force in the direction of the door attached spring arm that it reflects a resultant acting in a direction to keep the door effectively closed. Between spring securing points 9 and 9c the lateral spring force is at least partly absorbed by the fixed pivot 8. The closer the door securing point of the spring gets to the line 8—14a, the greater is the absorption of this force with substantially a maximum at 9a. Though this absorption of the lateral spring force decreases between 9a and 9c, the lateral spring force itself decreases by the de-compression of the spring and the arm directional spring force increasingly outbalances the lateral spring force to such extent that the latter for practical considerations ceases to materially affect the former.

When further opening the door to, for instance, the position 5d, which is at a slight downward incline, and at which a slice of bread on the inside of the door would have become reversed, the securing point of the spring to the door is at 9d. At this point the spring assumes the shape and position 13d. The distance between spring ends of the spring in position 13d is greater than the distance between spring ends of the charged spring in position 13 and equals approximately the distance between spring ends of the uncharged spring in position 13e. Thus at 9d there is substantially no lateral thrust of the spring, though there is an increased arm directional thrust of the spring by reason of the further deflection of the base mounted spring arm, against the spring resistance of coiled spring element 10d. This arm directional thrust of the spring at 9d is, however, substantially in a direction at a relatively small angle to the line 8—9d. Consequently only a relatively small proportion of this thrust is effectively exerted, i. e., substantially in the direction of the door-closing arc of travel of the spring securing points on the door around pivot 8. The more closely the arm directional thrust approximates tangential direction, the less is the loss in thrust force through pivot absorption. Conversely, the more closely the arm directional thrust approximates the line between door pivot and spring securing point (to the door) the higher is the loss of thrust force through pivot absorption.

The spring force, particularly that against which the base secured arm of the spring is deflectible, must be appropriately proportioned to such factors as the weight of the door, varying distance (with opening or closing of door) of pivot point from either end of door, in accordance with well known principles of physics and engineering. When the door is in the closed position, it is almost vertical with its mass predominantly in substantially vertical alignment with the pivot point; only a relatively small spring force is required to maintain the door in a closed position. This may be supplied by a substantially lateral thrusting spring force or within the preferred embodiment of the invention by the resultant of a laterally and arm directionally acting spring force. As the door is opened, the gravitational force exerted thereon increases with the distance of the door top from the vertical through the pivot point. The spring force against which the deflecting spring arm moves can then be calculated in a well known manner and can be predetermined empirically for any given construction. In a practical application, door position 5b (Fig. 4) could be selected, for instance, as the one at which the spring force of the coiled spring element 10d is to be calculated in well known manner to balance the gravitational forces exerted upon the door with respect to the pivot. The door in the position 5b would then be in spring balance and when placed in that position would remain substantially suspended without moving either upward or downward.

Broadly speaking the invention comprises in combination with at least one slice-reversing door of a toaster of the aforementioned type, spring means having at least one arm secured to said door at a securing point positioned, with the door closed, below the axis of pivot of said door, said arm substantially extending at said securing point at an angle of less than 90° and preferably less than 60° to the vertical on said axis through said securing point, said arm being mounted for substantially arm directional lifting against spring resistance and for substantially lateral deflection against spring resistance throughout at least part of the arc of travel of said securing point around said axis when opening said door. The arm is preferably mounted at said securing point to be substantially laterally deflectible to positions approximating substantially tangential direction to said arc of travel. The arm may be secured to the door when in the closed position without spring tension though in a position to cause any opening of the door to be against spring resistance. It is preferred, however, to mount the arm at said securing point with a spring force exerted in substantialy door closing direction.

As is evident from the drawings, the preferred embodiment of the invention comprises in combination with a toaster door of the type mentioned, spring means and preferably an arcuate spring having at least one first arm, of the aforementioned type and characteristics, mounted and secured to said door as aforestated, and at least one second arm mounted for approximately angular deflection against spring resistance by the lifting of said first arm and preferably for such deflection at a point substantially below the door securing point.

The preferred spring in accordance with the invention is an arcuate spring, so shaped that when secured to the door, preferably under tension, its door secured arm substantially extends at the door securing point at an angle of substantially between 10° and 60° to the vertical on the axis of door pivot through the door securing point; the arcuate spring has preferably substantially straight line directional end portions defining its two arms and is preferably so shaped that the door secured spring arm is substantially tangential at the door securing point to the circle (partially indicated in the drawings by for example broken, curved line R) through said point around the substantially fixed mounting point of the spring. Best results are obtained when the door securing point is positioned, with the door closed, below and slightly forward of the axis of pivot of the door and with the spring mounting point substantially positioned below the door securing point on the vertical to the axis of pivot of the door substantially extending at an angle with the horizontal on said axis of not exceeding substantially 60° and preferably between 20° and 50°.

Thus in the practical application of the invention a toaster with substantially vertical slice-reversing doors may be constructed. The door is only under relatively slight spring tension sufficient to maintain the same satisfactorily closed by way of a spring thrust comprising the resultant of a substantially lateral spring force through spring compression and a substantially arm directional spring force through angular deflection against spring resistance of the spring arm. As the door is opened, the lateral spring force component decreases in its action on the door by reason of the fact that its thrust is increasingly directed towards the pivot until about maximum compression, at which point it is substantially completely absorbed. The spring force component acting by way of spring arm deflection against spring resistance becomes increasingly greater by reason not only of the increased deflection of the spring arm but also by reason of the greater approximation of its thrust in directions substantially tangential to the arc of travel of the spring securing point around the door pivot. This double action increase in spring thrust against the opening of the door aids in balancing the gravtational force acting on the door, which increases with the distance of the door top from the vertical over the pivot. By reason of this double action, furthermore, either a weaker spring resistance for deflection may be chosen than would be otherwise possible to balance the same opening distance of the door from the closed position, or alternatively it is possible with a given spring resistance against deflection to achieve a greater opening distance of the door than would be otherwise feasible. Depending upon the deflection resistance selected, as well as upon door weight, height, and such other factors as may affect the gravitational forces exerted upon the opening door, a point in the opening of the door will be reached at which the forces are in approximate balance and beyond which the weight of the door at the distance of its top from the vertical over the pivot will outbalance the deflection resistance of the spring arm, thus causing the door to move downwardly by its own weight but still cushioned by the spring thrust of the arm as it is further deflected against spring resistance.

Though within the preferred embodiment of my invention I find it of advantage to secure the arm portion mounted for deflection against spring resistance at a point below the spring securing point of the spring to the door, it is possible to raise the securing point of the deflecting arm to above the door securing point and even to above the door pivot.

Figure 7:
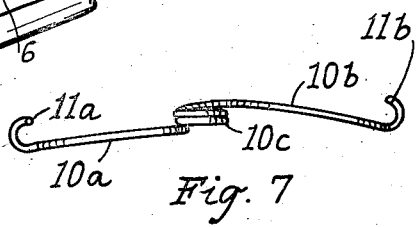
Figure 3:
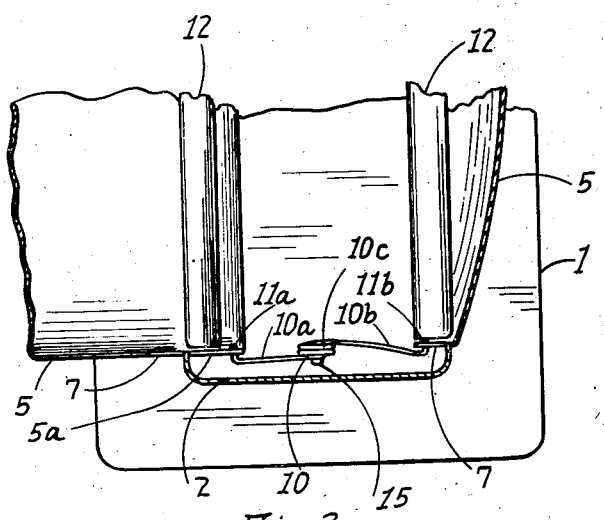
Fig. 3 is a top view of part of the construction shown in Fig. 2 viewed from the plane III—III thereof.

Within the scope of my invention one single spring element unit for each door may be used. Alternatively, and this construction is preferred, I find it of advantage to use a double spring element as, for instance, illustrated in Figs. 2, 3, 5, 6 and 7. In such case the coiled spring element 10c serves both of the individual spring elements 10a and 10b as a spring resistance against their deflection. As illustrated in Fig. 7 it is often expedient to somewhat bend the arms inwardly so as to clear the trip bar and at the same time bring the arm ends into substantial alignment with each other. Although one spring for each side of each door or a double spring for each side of each pair of doors may be used, I find it sufficient to provide only one side of each door with a suitable spring element in accordance with the invention.

The foregoing specific description is for purposes of illustration and not of limitation and it is therefore my intention that the invention be limited only by the appended claims or their equivalent wherein I have endeavored to claim broadly all inherent novelty.

I claim:

1. In toasters of the type having at least one slice-reversing door pivotable intermediate its ends, the improvement which comprises, in combination with at least one such door of such toaster, spring means having at least one arm laterally deflectable against spring resistance secured to said door at a securing point positioned, with the door closed, below the axis of pivot of said door, said arm substantially extending at said securing point with an arm directional spring thrust and in a downwardly direction at an angle of less than 90° to the vertical on said axis through said securing point, said arm being mounted for substantially arm directional lifting against spring resistance and for substantially lateral deflection against spring resistance throughout at least part of the arc of travel of said securing point around said axis when opening said door.

2. In toasters of the type having at least one slice-reversing door pivotable intermediate its ends, the improvement which comprises, in combination with at least one such door of such toaster, at least one arcuate spring defining with its end portions at least one first and one second arm respectively, said first arm being secured substantially at its end to said door, at a door securing point positioned, with the door closed, below the axis of pivot of said door, said first arm substantially extending at said door securing point with an arm directional spring thrust and in a downwardly direction at an angle of less than 90° to the vertical on said axis through said door securing point, said second arm being mounted substantially at its end at a mounting point substantially positioned below said door securing point, said spring being spring-tension compressible between said arms and mounted for substantially arm directional lifting of said first arm at said door securing point throughout at least the first part of the arc of travel of said door securing point around said axis, when opening said door, and for deflection of said second arm, actuated by the lifting of said first arm, and spring means for resisting said deflection of said second arm.

3. In toasters of the type having at least one slice-reversing door pivotable intermediate its ends, the improvement which comprises, in combination with at least one such door of such toaster, at least one arcuate spring, spring tension compressible between ends and defining with its end portions at least one first and one second arm respectively, said first arm being secured substantially at its end to said door at a door securing point positioned, with the door closed, below and forward of the axis of pivot of said door, said first arm substantially extending at said door securing point in said position with an arm directional spring thrust and in a downwardly direction at an angle of substantially between 10° and 60° to the vertical on said axis through said door securing point, said second arm being deflectibly mounted substantially at its end at a substantially stationary spring mounting point substantially positioned below said door securing point on the vertical to said axis of pivot and substantially extending at an angle with the horizontal on said axis of substantially from 20° to 50°, and spring means for resisting the deflection of said second arm, said arcuate spring being tension-compressed between arms when said door is substantially closed.

4. In toasters of the type having at least one slice-reversing door pivotable intermediate its ends, the improvement which comprises, in combination with at least one such door of such toaster, at least one arcuate spring, spring tension compressible between ends and defining with its end portions at least one first and one second arm respectively, said first arm being secured substantially at its end to said door, at a door securing point positioned, with the door closed, below the axis of pivot of said door, said first arm substantially extending at said door securing point with an arm directional spring thrust and in a downwardly direction at an angle of less than 90° to the vertical on said axis through said door securing point for substantially arm directional lifting throughout at least part of the arc of travel of said door securing point around said axis, when opening said door, and a resistance spring coil carried at and as a substantially integral extension of the end of said second arm and mounted at a substantially stationary mounting point substantially positioned below said door securing point, said second arm being deflectible against the spring resistance of said coil upon the lifting of said first arm and said arcuate spring being tension-compressed when said door is substantially closed.

5. The improvement in accordance with claim 4 in which said first arm extends at an angle not exceeding substantially 60° and in which said arcuate spring has substantially straight line directional end portions defining said first and second arms respectively.

6. The improvement in accordance with claim 4 in which said first arm extends at an angle not exceeding substantially 60°, in which said arcuate spring has substantially straight line directional end portions defining said first and second arms respectively and in which said mounting point is on the vertical to said axis of pivot substantially extending at an angle with the horizontal on said axis of not exceeding substantially 60°.

7. In toasters of the type having at least two slice-reversing doors substantially in opposing positions on either side thereof, the improvement which comprises in combination with any two such doors of such toaster a double spring having at least one first arcuate spring element secured to one of said doors and at least one second arcuate spring element secured to the other of said doors, each said arcuate spring elements comprising at least one arcuate spring, spring tension compressible between ends and defining with its end portions at least one first and one second arm respectively, said first arm being secured substantially at its end to its door at a door securing point positioned, with the door closed, substantially below the axis of pivot of said door, each said first arm substantially extending at its door securing point with an arm directional spring thrust and in a downwardly direction at an angle of less than substantially 90° to the vertical on the axis of pivot through its door securing point for substantially arm directional lifting throughout at least part of the arc of travel of its door securing point around the axis of pivot when opening its door, and a resistance spring coil common to both second arms of said double spring and carried at and as a substantially integral extension of the ends of each second arm thereby connecting the same to form said double spring as a substantially single unit, said spring coil being mounted at a substantially stationary mounting point substantially positioned below each of the door securing points, each second arm being deflectible against the spring resistance of said coil upon the lifting of its first arm and each arcuate spring being tension-compressed with respect to its door when the latter is substantially closed.

8. In toasters of the type having at least two slice-reversing doors substantially in opposing positions on either side thereof, the improvement which comprises in combination with any two such doors of such toaster a double spring having at least one first arcuate spring element secured to one of said doors and at least one second arcuate spring element secured to the other of said doors, each said arcuate spring elements comprising at least one arcuate spring, spring tension compressible between ends and defining with its substantially straight end portions at least one first and one second arm respectively, said first arm being secured substantially at its end to its door at a door securing point positioned, with the door closed, below and forward of the axis of pivot of its door, said first arm substantially extending at its door securing point in said position with an arm directional spring thrust and in a downwardly direction at an angle of substantially not exceeding 60° to the vertical on said axis through said door securing point, said second arm being deflectibly mounted substantially at its end at a substantially stationary spring mounting point positioned substantially below its door securing point on the vertical to said axis of pivot substantially extending at an angle with the horizontal of substantially not exceeding 60° and spring means, common to the second arms of both said arcuate springs, for resisting the angular deflection of each said second arm, each of said arcuate springs being tension-compressed when its door is substantially closed.

9. The improvement in accordance with claim 8 in which said spring means comprise a coiled resistance spring carried as a substantially integral part of said double spring between second arm ends.

VITO MAZZARISI.